United States Patent
Ueda et al.

(10) Patent No.: US 6,555,621 B1
(45) Date of Patent: Apr. 29, 2003

(54) BINDER RESIN COMPOSITION AND PROCESS FOR THE PRODUCTION THEREOF

(75) Inventors: Takaaki Ueda, Iwakuni (JP); Keiji Urata, Iwakuni (JP)

(73) Assignee: Nippon Paper Industries Co., Ltd., Tokyo (JP)

( * ) Notice: Subject to any disclaimer, the term of this patent is extended or adjusted under 35 U.S.C. 154(b) by 0 days.

(21) Appl. No.: 09/622,926

(22) PCT Filed: Oct. 18, 1999

(86) PCT No.: PCT/JP99/05731
§ 371 (c)(1),
(2), (4) Date: Sep. 8, 2000

(87) PCT Pub. No.: WO00/42103
PCT Pub. Date: Jul. 20, 2000

(30) Foreign Application Priority Data

Jan. 18, 1999 (JP) .............................. 11-008886

(51) Int. Cl.$^7$ .................................................. C08F 8/46
(52) U.S. Cl. ..................... 525/107; 525/111; 525/292; 525/301
(58) Field of Search ................. 525/292, 107, 525/111, 301

(56) References Cited

U.S. PATENT DOCUMENTS

| | | |
|---|---|---|
| 4,091,047 A | 5/1978 | Serratore et al. |
| 4,443,584 A | 4/1984 | Michel |
| 5,030,681 A | 7/1991 | Asato et al. |
| 5,424,341 A | 6/1995 | Ogoe et al. |

FOREIGN PATENT DOCUMENTS

| | | |
|---|---|---|
| EP | 0 265 522 | 5/1988 |
| GB | 1 118 545 | 7/1968 |
| JP | 57-036128 | 2/1982 |
| JP | 60-013807 | 1/1985 |
| JP | 61-25667 | 9/1986 |
| JP | 4-028701 | 1/1992 |
| JP | 4-089832 | 3/1992 |
| JP | 7-018016 | 1/1995 |
| JP | 8-157768 | 6/1996 |
| JP | 9-136915 | 5/1997 |
| JP | 10-204372 | 8/1998 |
| JP | 10-251354 | 9/1998 |
| JP | 11-189742 | 7/1999 |

OTHER PUBLICATIONS

Patent Abstracts of Japan, JP 09 316134, Dec. 9, 1997.
Patent Abstracts of Japan, JP 57 036128, Feb. 26, 1982.
JP 08100032 A, Apr. 16, 1996, Abstract only, Patent Abstracts of Japan.

*Primary Examiner*—Jeffrey Mullis
(74) *Attorney, Agent, or Firm*—Oblon, Spivak, McClelland, Maier & Neustadt, P.C.

(57) ABSTRACT

The invention provides a novel binder resin composition.

A binder resin composition characterized by comprising carboxyl group-containing chlorinated syndiotactic polyolefin resin with chlorine content of 0.1 to 40 wt. %, grafting level of α,β-unsaturated carboxylic acid and/or its acid anhydride of 10 wt. % and weight average molecular weight of 30000 to 220000 and organic solvent.

The carboxyl group-containing chlorinated syndiotactic polyolefin obtainable from polyolefin resin produced using metallocene compound exhibits good state of solution even if the chlorine content may be low, and is excellent in the adherence to polyolefinic prime material and the solvent resistance.

19 Claims, No Drawings

BINDER RESIN COMPOSITION AND PROCESS FOR THE PRODUCTION THEREOF

BACKGROUND OF THE INVENTION

The present invention relates to a binder resin composition to be used when painting onto polyolefinic moldings and a method for producing the same.

Because of many advantages such as light weight, antirust and broad degree of freedom for design, in recent years, plastics are used broadly as the materials of automotive parts, electrical parts, building materials, etc. Above all, because of low price and many excellent properties such as moldability, chemical resistance, heat resistance, water resistance and good electrical characteristics, polyolefinic resins are used in broad range as industrial materials and the growth of demand thereof is also expected in future. Different from synthetic resins with polarity, however, polyolefinic resin is nonpolar and crystalline, hence it has also drawbacks of difficult painting and adhesion therewith.

For treating before painting and adhesion, a method of activating the surface of molded products by plasma treatment or gas flame treatment, or a method of coating a primer (undercoating agent) having chlorinated polyolefin as a major component is adopted.

For the painting of automotive bumpers with polypropylene, for example, in Japanese Unexamined Patent Publication No. Sho 57-36128 and Japanese Patent, Publication No. Sho 63-36624, primer compositions having chlorinated modified polyolefin as a major component are disclosed.

Although these primers comprising chlorinated products are excellent in the conventional adherence to polyolefin, recently, prime materials with insufficient adherence of primer have also appeared with high rigidification of prime materials, hence conventional chlorinated polyolefinic resins cannot correspond sufficiently as primers.

As described above, it is the status quo that, with conventional chlorinated polyolefinic resins or their derivatives, strong adhesiveness has not been obtained to some prime materials.

Said primer compositions and the like proposed so far were those having chlorinated isotactic polypropylene obtained by chlorinating isotactic polypropylene (IPP) produced using Ziegler-Natta catalyst as a polymerization catalyst, as a major component. In recent years, metallocene compounds have been developed as polymerization catalysts of polyolefin and, in Japanese Unexamined Patent Publication Nos. Hei 7-138325 and Hei 7-149975, etc., polymerization examples of syndiotactic polypropylene (SPP) produced using metallocene compound as a polymerization catalyst are disclosed. This SPP has features such as narrower molecular weight distribution, more potential of arbitrary control of molecular weight and lower melting point and glass transition point than those of IPP, and additionally, it is excellent in the transparency when converted to resin moldings, thus making it as a resin that more development can be expected hereafter.

As one utilizing method of SPP, in Japanese Unexamined Patent Publication No. Hei 7-18016, examples of adhesives that use chlorinated products of syndiotactic polypropylene are disclosed. However, because these adhesives are simply using the chlorinated products of syndiotactic polypropylene, when using as primers at the time of painting onto PP moldings, they have a drawback of no adherence to upper paint.

The purpose of the invention is to provide a binder resin composition with excellent solvent solubility, with excellent adherence to polypropylenic prime materials, and also with excellent adherence to upper paint.

SUMMARY OF THE INVENTION

The inventors have solved the problems aforementioned with a binder resin composition characterized by comprising carboxyl group-containing chlorinated syndiotactic polyolefin resin with chlorine content of 0.1 to 40 wt. %, grafting level of $\alpha,\beta$-unsaturated carboxylic acid and/or its acid anhydride of 0.5 to 10 wt. % and weight average molecular weight of 30000 to 220000 and organic solvent.

DETAILED DESCRIPTION OF THE INVENTION

The polyolefin resin being raw material of the invention is a syndiotactic polyolefin produced by using metallocene catalyst as a polymerization catalyst. It is possible to use syndiotactic polypropylene (SPP), propylene-$\alpha$-olefin copolymer produced by using metallocene catalyst as a polymerization catalyst, or the like solely or by mixing two or more kinds.

The $\alpha$-olefin component to be used in the propylene-$\alpha$-olefin copolymer is preferable to be at least one kind of $\alpha$-olefin with number of carbon atoms of 2 or 4 to 6 selected from, for example, ethylene, 1-butene, 1-pentene, 4-methyl-1-petene, 3-methyl-1-petene and 1-hexene. The ratio of propylene component to a-olefin component in the copolymer is not particularly restricted, but the propylene component is desirable to be not less than 50 mol %.

The metallocene catalyst to be used here is a catalyst with metallocene compound of Group IV transition metal combined with methylaluminoxane obtainable by hydrolyzing trimethylaluminum, and, upon polymerization of olefin, it has such features that the molecular weight distribution is narrower, random copolymerizability is more excellent resulting in narrower composition distribution and wider range of copolymerizable comonomers, compared with conventional Ziegler-Natta catalyst.

The syndiotactic polyolefin resin to be used in the binder resin composition of the invention can be produced by the publicly known method using metallocene catalyst. As a concrete resin, Tiallo (trade name of syndiotactic polypropylene from,Mitsui Chemicals Inc.) can be used.

The binder resin composition of the invention can be obtained by introducing $\alpha,\beta$-unsaturated carboxylic acid and/or its acid anhydride and chlorine to said syndiotactic polyolefin resin, and the production thereof is possible by two methods mentioned below. Namely, they are a method (first method) of graft polymerizing $\alpha,\beta$-unsaturated carboxylic acid and/or its acid anhydride beforehand onto syndiotactic polyolefin-resin and then conducting chlorination reaction, and a method (second method) of conducting chlorination reaction and then graft polymerizing $\alpha,\beta$-unsaturated carboxylic acid and/or its acid anhydride.

In following, the concrete producing methods will be exemplified. In the first method, graft copolymerizing $\alpha,\beta$-unsaturated carboxylic acid and/or its acid anhydride first onto syndiotactic polyolefin resin can be performed by the publicly known methods; a method (melt method) of melting said resin by heating over melting point in the presence of radical generator and reacting with $\alpha,\beta$-unsaturated carboxylic acid and/or its acid anhydride, a method (solution method) of dissolving said resin into organic solvent and then reacting with α,β-unsaturated carboxylic acid and/or its acid anhydride by heating under stirring in the presence of radical generator, and the like.

In the case of melt method, there is an advantage of simple procedure, because of reacting for short time at a temperature of over melting point and under 400° C. using Banbury mixer, kneader, extruder, etc.

While, in the case of solution method, it is desirable to use aromatic solvents such as toluene and xylene, but, besides, it may also be safe to use ester type solvent, ketone type solvent, etc. by mixing partially. The radical generator to be used for the reaction can be selected appropriately from publicly known ones, but, particularly, organic peroxide type compounds are desirable.

As said organic peroxide.type compounds, for example, di-t-butyl peroxide, dicumyl peroxide, t-butylcumyl peroxide, benzoyl peroxide, dilauryl peroxide, cumene hydroperoxide, t-butyl hydroperoxide, 1,1-bis(t-butylperoxy)-3,5,5-trimethylcyclohexane, 1,1-bis(t-butylperoxy)cyclohexane, cyclohexanone peroxide, t-butylperoxy benzoate, t-butylperoxy isobutyrate, t-butylperoxy-3,5,5-trimethylhexanoate, t-butylperoxy-2-ethylhexanoate, t-butylperoxy isopropylcarbonate, cumylperoxy octoate, etc. are mentioned.

In the case of solution method, however, because it is required to replace said solvent with chlorinating solvent such as chloroform, when conducting next chlorinating reaction after graft copolymerization of α,β-unsaturated carboxylic acid and/or its acid anhydride, the melt method is preferable in the first method.

Following chlorinating reaction is conducted by dissolving the syndiotactic polyolefin resin graft copolymerized with α,β-unsaturated carboxylic acid and/or its acid anhydride into chlorine-containing solvent such as chloroform and then blowing-in gaseous chlorine while irradiating ultra-violet rays or in the presence of said organic peroxide.

In the method of conducting chlorinating reaction and successively graft polymerizing α,β-unsaturated carboxylic acid and/or its acid anhydride being the second method, first, the syndiotactic polyolefin resin is dissolved into chlorine-containing solvent such as chloroform, the chlorinating reaction is conducted similarly to the case of the first method to produce chlorinated syndiotactic polyolefin resin, the solvent is changed to a solvent such as toluene or xylene, and then α,β-unsaturated carboxylic acid and/or its acid anhydride-is graft copolymerized in the presence of said organic peroxide. This reaction can be implemented at a temperature of over 50° C. and under boiling point of solvent.

In the cases of the first method and second method, the purpose of graft copolymerizing α,β-unsaturated carboxylic acid and/or its acid anhydride onto syndiotactic polyolefin resin is to provide the adherence to upper paint, when using the inventive binder resin composition as a primer. The polarity of chlorinated polyolefin is low by nature, and, when using as a primer (undercoating agent) as it is, the adherence to PP prime material is good, but the adherence to upper paint with high polarity (e.g. polyurethane paint and melamine paint) is little. It becomes important, therefore, to enhance the polarity of chlorinated polyolefin by graft copolymerizing α,β-unsaturated carboxylic acid and/or its acid anhydride.

As usable α,β-unsaturated carboxylic acids and/or their acid anhydrides, for example, maleic acid, citraconic acid, itaconic acid, aconitic acid and their acid anhydrides, acrylic acid, methacrylic acid, fumaric acid, mesaconic acid, etc. can be exemplified, but, considering the grafting ability to polyolefinic resin, maleic anhydride is most suitable.

In the invention, the amount to introduce α,β-unsaturated carboxylic acid and/or its acid anhydride through graft copolymerization is optimum to be 0.5 to 10 wt. %. If less than 0.5 wt. %, then the adherence between primer composition obtained and upper paint cannot be obtained sufficiently, and, if over 10 wt. %, then the moisture resistance tends to decrease.

The less the chlorine content of carboxyl group-containing chlorinated syndiotactic polyolefin resin, the better the adherence to polypropylenic resin, but the solubility into organic solvent decreases, and, with increasing chlorine content, the adherence to polypropylenic resin decreases.

Hence, the chlorine content is optimum to be 0.1 to 40 wt. %, preferably 1 to 30 wt. %.

In addition, the weight average molecular weight of carboxyl group-containing chlorinated syndiotactic polyolefin resin obtained, which was determined by means of gel permeation chromatography (GPC) making polystyrene resin as a standard, is preferable to be 30000 to 220000. If under 30000, then the coherence of resin is not enough, and, if over 220000, the spray workability decreases, which is unpreferable.

Moreover, the compositions of the invention are used usually after dissolved into organic solvent. The solution concentration may be selected appropriately depending on the uses, but, since too high or too low solution concentration damages the painting workability, the resin concentration is preferable to be 5 to 30 wt. %.

The solvents to be used are preferable to be aromatic solvents such as toluene and xylene and, besides, ester solvents such as ethyl acetate and butyl acetate, ketone solvents such as methyl ethyl ketone and methyl isobutyl ketone, aliphatic solvents such as n-hexane and heptane, and alicyclic solvents such as cyclohexane, methylcyclohexane and ethylcyclohexane can be used. Furthermore, for enhancing the stability on preservation of resin solution, it is preferable to add alcohols such methanol, ethanol and iso-propyl alcohol and propylenic glycol ethers such as propylene glycol methyl ether, propylene glycol ethyl ether and propylene glycol tertiary-butyl ether in amounts of 1 to 20% to said solvents, solely or by mixing two or more kinds.

To binder resin composition of the invention is a resin composition dissolved into organic solvent. The production of this resin composition is possible by replacing the chlorinating solvent such as chloroform with said solvent, utilizing the difference in boiling point. Moreover, it may also be safe that, after added epoxy compound or the like to the reaction liquor having completed the reaction as a stabilizer, the stabilized material is solidified by supplying to a vent extruder equipped with solvent-removing suction at the part of screw shaft, and, thereafter, it is dissolved into said solvent. The solidification can be implemented by the publicly known method known already, for example, by using a vent extruder equipped with underwater cutting pelletizer at the blow-off port of extruder, vent extruder and pelletizer capable of cutting strand-like resin, or the like.

The chlorinated polyolefin to be used for the binder resin composition of the invention deteriorates with de-hydrochloric acid accompanied, when exposing to ultra-violet rays or high temperature. If the chlorinated polyolefin happens to deteriorate due to de-hydrochloric acid, not only the coloring of resin, but also decreased physical properties such as decreased adherence to PP prime material, and aggravation of working environment due to freed hydrochloric acid are caused, hence the addition of stabilizer is essential. Particularly preferable as a stabilizer is epoxy compound.

Although the epoxy compound is not particularly restricted, one compatible with chlorinated resin is preferable, and such epoxy compound with epoxy equivalent of around 100 to 500 and with one or more epoxy groups per molecule can be exemplified. For example, epoxidated soybean oil and epoxidated linseed oil obtainable by epoxidating vegetable oils having natural unsaturated group with peracids such as peracetic acid, epoxidated fatty acid esters obtainable by epoxidating unsaturated fatty acids such as oleic acid, tall oil fatty acid and soybean oil fatty acid, epoxidated alicyclic compound represented by epoxidated tetrahydrophthalate, and products obtainable by condensing bisphenol A or polyhydric alcohol with epichlorohydrin, for example, bisphenol A glycidyl ether, ethylene glycol glycidyl ether, propylene glycol glycidyl ether, glycerol polyglycidyl ether, sorbitol polyglycidyl ether, etc. are exemplified. Moreover, monoepoxy compounds represented by butyl glycidyl ether, 2-ethylhexyl glycidyl ether, decyl glycidyl ether, stearyl glycidyl ether, allyl glycidyl ether, phenyl glycidyl ether, sec-butylphenyl glycidyl ether, tert-butylphenyl glycidyl ether, phenol polyethylene oxide glycidyl ether, etc. are exemplified. Moreover, metallic soaps such as calcium stearate and lead stearate, organometallic compounds such as dibutyl tin dilaurate and dibutyl tin maleate and hydrotalcite compounds, which are used a the stabilizers of poly(vinyl chloride) resin, can also be used, and it doesn't matter whether these are used in combination.

The binder resin composition concerning the invention may be coated as it is for use, but it may be used after mixed with solvent, pigment and other additives. Moreover, though said composition exhibits balanced physical properties of painted film by itself, but, if need be, cyclized rubber, petroleum resin, cumarone-indene resin, chlorinated polyolefin resin, acrylic resin, alkyl resin, etc. may be added additionally for use.

One of the features of syndiotactic polypropylene (SPP) lies in slightly lower crystallinity and also lower softening temperature than isotactic polypropylene (IPP). Hence, even if the chlorine content may be made very low, the solubility into solvent is good. Yet, from the fact that the chlorine content can be set up low, the adherence to polyolefinic prime material is also good. Moreover, it is considered that, due to the enhanced polarity of resin by graft copolymerizing α,β-unsaturated carboxylic acid and/or its acid anhydride, the adherence to upper coating was achieved.

Furthermore, very narrow molecular weight distribution (Mw/Mn=about 2) is also mentioned to be a feature of SPP. In the invention, it has become clear that this narrow molecular weight distribution of chlorinated SPP contributes to the improved high adherence. Namely, the low-molecular weight component becomes disadvantageous for the adherence to prime material and gasoline resistance, thus the chlorinated IPP containing much low-molecular weight component is poor in the solvent resistance, etc.

In following, the invention will be illustrated concretely based on examples, but the invention is not confined to these.

EXAMPLE

Example 1

Syndiotactic polypropylene (SPP from Mitsui Chemicals Inc., MI=3.7 g/10 min) was fed into a biaxial extruder (L/D=34, φ40 mm, first barrel through seventh barrel), and the thermal degradation was performed under conditions of retention time of 10 minutes and barrel temperature of 350° C. (first barrel through seventh barrel) to obtain SPP with melt viscosity of about 2000 mPa·s at 190° C. Five kg of this resin were molten by heating to 190° C. in a four-neck flask attached with stirrer, cooling pipe, thermometer and dropping funnel. After the inside of flask was replaced with nitrogen for 10 minutes, 250 g of maleic anhydride were put in over about 5 minutes while stirring, and then 20 g of di-t-butyl peroxide were added dropwise-over about 30 minutes as a radical generator. After continued the reaction further for 30 minutes, unreacted maleic anhydride was taken off while reducing the pressure in flask by aspirator. Next, this product was put into a glass-lined reaction vessel, 50 L of chloroform were added, and gaseous chlorine was blown-in from the bottom of reaction vessel under pressure of 2 kg/cm$^2$ while irradiating ultraviolet rays to chlorinate. On the way, sampling was made six times, and, after the solvent chloroform was distilled off by evaporator, respectively, it was replaced with toluene to obtain a 30 wt. % toluene solution of each chlorinated SPP modified with maleic anhydride. As a stabilizer, Epicote 828 (from Yuka Shell Epoxy Co.) was added in amounts of 4% based on resin.

In Table 1, the chlorine content, grafting level of maleic anhydride and weight average molecular weight of resins obtained are shown. The resin solutions obtained were allowed to stand for a month at room temperature, but no changes were observed in the state of solution and appearance.

One hundred grams of the resin solution (solids 30%) obtained or the resin solution (solids 30%) that was allowed to stand for a month and 20 g of titanium dioxide were kneaded for 3 hours in a sandmill, and then viscosity was adjusted with xylene so as to give 13 to 15 sec/20° C. through No. 4 Ford cup. This paint was painted onto a test plate that was extrusion molded with syndiotactic polypropylene (SPP from Mitsui Chemicals Inc., MI=3.7 g/10 min) by air type spray gun so as the film thickness to become about 10 μm. Next, cure type two-component urethane paint was painted (film thickness: about 30 μm). After dried for 30 minutes at 80° C. and allowed to stand for 24 hours at room temperature, the physical properties were evaluated. The test results of primer are shown in Table 2.

Moreover, said paint with viscosity adjusted was painted onto an ultrahigh rigidity polypropylene plate (TX-933A from Mitsubishi chemical Co.) by air type spray gun so as the film thickness to become about 10 μm. Next, cure type two-component urethane paint was painted (film thickness: about 30 μm). After dried for 30 minutes at 80° C. and allowed to stand for 24 hours at room temperature, the physical properties were evaluated. The test result of primer are shown in Table 3.

Example 2

Five kg of syndiotactic polypropylene (SPP from Mitsui Chemicals Inc., MI=3.7 g/10 min) were put into a glass-lined reaction vessel, 50 L of chloroform were added, and gaseous chlorine was blown-in from the bottom of reaction vessel under pressure of 2 kg/cm$^2$ while irradiating ultraviolet rays to chlorinate. On the way, sampling was made six times, and, after the solvent chloroform was-distilled off-by evaporator, respectively, it was replaced with toluene to obtain a 30 wt. % toluene solution of each chlorinated SPP. Respective chlorine contents were 14.2, 18.2, 20.8, 22.3, 25.1 and 32.2 wt. %.

Into a four-neck flask attached with stirrer, cooling pipe, thermometer and dropping funnel, 333 g of 30 wt. % toluene solution of each of chlorinated SPPs with 6 levels of chlorine contents obtained through the reaction aforementioned were put in and stirred under heating at 90° C. After 10 g, 8 g, 6 g, 4 g, 4 g or 5 g of maleic anhydride were added to each chlorinated SPP and dissolved, and 4 g, 4 g, 3 g, 5 g, 1 g and 1 g of benzoyl peroxide were added, respectively, as a radical generator, reaction was started. After stirring for 3 hours at 90° C., the solution concentration was adjusted to 30% with toluene. As a stabilizer, Epiol SB (from Nippon Oil and Fats Co.) was added in amounts of 4% based on resin, respectively.

In Table 1, the chlorine content, grafting level of maleic anhydride and weight-average molecular weight of resins obtained are shown. The resin solutions obtained were allowed to stand for a month at room temperature, but no changes were observed in the state of solution and appearance. In addition, the primer test was implemented similarly to Example 1. The results are shown in Table 2 and Table 3.

Example 3

Resin pellets prepared by mixing in proportion of 0.6 kg of maleic anhydride and 0.2 kg of di-t-butyl peroxide to 10 kg of syndiotactic polypropylene (SPP from Mitsui Chemicals Inc., MI=3.7 g/10 min) were fed into a biaxial extruder (L/D=34, φ40 mm, first barrel through seventh barrel, with deairing vent equipped in the seventh barrel) to react. The reaction was performed under conditions of retention time of 10 minutes and barrel temperature of 190° C. (first barrel through seventh barrel), and, in the seventh barrel, remaining unreacted maleic anhydride was removed by procedure of reducing pressure. Thus, maleic anhydride-modified SPP with melt viscosity of product obtained of about 3000 mpa·s at 190° C. and grafting level of maleic anhydride of 4% was obtained.

Five kg of this resin were put into a glass-lined reaction vessel, 50 L of chloroform were added, and gaseous chlorine was blown-in from the bottom of reaction vessel under pressure of 2 kg/cm$^2$ while irradiating ultraviolet rays to chlorinate. On the way, sampling was made six times, and, after the solvent chloroform was distilled off by evaporator, respectively, it was replaced with toluene to obtain a 30 wt. % toluene solution of each chlorinated SPP modified with maleic anhydride. As a stabilizer, Epicote 828 (from Yuka Shell Epoxy Co.) was added in amounts of 4% based on resin.

In Table 1, the chlorine content, grafting level of maleic anhydride and weight average molecular weight of resins obtained are shown. The resin solutions obtained were allowed to stand for a month at room temperature, but no changes were observed in the state of solution and appearance. In addition, the primer test was implemented similarly to Example 1. The results are shown in Table 2 and Table 3.

Comparative Example 1

Five kg of isotactic polypropylene (IPP) with melt viscosity of about 2300 mpa·s at 190° C. were molten by heating to 190° C. in a four-neck flask attached with stirrer, cooling pipe, thermometer and dropping funnel. After the inside of flask was replaced with nitrogen for 10 minutes, 250 g of maleic anhydride were put in over about 5 minutes while stirring, and then 20 g of di-t-butyl peroxide were added dropwise over about 30 minutes as a radical generator. After continued the reaction further for 30 minutes, unreacted maleic anhydride was taken off while reducing the pressure in flask by aspirator. Next, this product was put into a glass-lined reaction vessel, 50 L of chloroform were added, and gaseous chlorine was blown-in from the bottom of reaction vessel under pressure of 2 kg/cm$^2$ while irradiating ultraviolet rays to chlorinate. On the way, sampling was made four times, and, after the solvent chloroform was distilled off by evaporator, respectively, it was replaced with toluene to obtain a 30 wt. % toluene solution of each chlorinated IPP modified with maleic anhydride. As a stabilizer, Epiol SB (from Nippon Oil and Fats Co.) was added, respectively, in amounts of 4% based on resin.

In Table 1, the chlorine content, grafting level of maleic anhydride and weight average molecular weight of resins obtained are shown. The resin solutions obtained were allowed to stand for a month at room temperature, but no changes were observed in the state of solution and appearance. In addition, the primer test was implemented similarly to Example 1. The results are shown in Table 2 and Table 3.

Comparative Example 2

Syndiotactic polypropylene (SPP from Mitsui Chemicals Inc., MI=3.7 g/10 min) were fed into a biaxial extruder (L/D=34, φ40 mm, first barrel through seventh barrel), and the thermal degradation was performed under conditions of retention time of 10 minutes and barrel temperature of 350° C. (first barrel through seventh barrel) to obtain SPP with melt viscosity of about 2000 mPa·s at 190° C. Next, 5 kg of this SPP were put into a glass-lined reaction vessel, 50 L of chloroform were added, and gaseous chlorine was blown-in from the bottom of reaction vessel under pressure of 2 kg/cm$^2$ while irradiating ultraviolet rays to chlorinate. On the way, sampling was made four times, and, after the solvent chloroform was distilled off by evaporator, respectively, it was replaced with toluene to obtain a 30 wt. % toluene solution of each chlorinated SPP. As a stabilizer, Epicote 828 (from Yuka Shell Epoxy Co.) was added in amounts of 4% based on resin.

In Table 1, the chlorine content and weight average molecular weight of resins obtained are shown. The resin solutions obtained were allowed to stand for a month at room temperature, but no changes were observed in the state of solution and appearance. In addition, the primer test was implemented similarly to Example 1. The results are shown in Table 2 and Table 3.

Comparative Example 3

By performing the procedure quite similar to Example 1, each of chlorinated SPPs modified with maleic anhydride at six levels of chlorine contents ranging from 14 to 34 wt. % was obtained, but no epoxy compound was added.

In Table 1, the chlorine content and weight average molecular weight of resins obtained are shown. When these resin solutions were allowed to stand for a month at room temperature, all resin solutions discolored to reddish brown. With resin solutions immediately after production and resin solutions allowed-to stand for a month at room temperature, the primer test was implemented similarly to Example 1. The results are shown in Table 2 and Table 3.

TABLE 1

|  |  | Chlorine content (wt %) | Maleic anhydride (wt %) | Average molecular weight 1) |  |  | State of solution |
|---|---|---|---|---|---|---|---|
|  |  |  |  | Mw | Mn | Mw/Mn |  |
| Example 1 | 1 | 14.7 | 3.9 | 52800 | 27800 | 1.90 | Good |
|  | 2 | 17.1 | 3.7 | 55000 | 27300 | 2.01 | Good |
|  | 3 | 19.5 | 3.5 | 54400 | 27600 | 1.97 | Good |
|  | 4 | 22.6 | 3.4 | 56000 | 27400 | 2.03 | Good |
|  | 5 | 26.1 | 3.3 | 56000 | 27400 | 2.04 | Good |
|  | 6 | 33.4 | 2.9 | 54000 | 26500 | 2.04 | Good |
| Example 2 | 1 | 14.2 | 8.5 | 74000 | 36600 | 2.02 | Good |
|  | 2 | 18.2 | 6.7 | 42000 | 21000 | 2.02 | Good |
|  | 3 | 20.8 | 5.3 | 69200 | 35500 | 1.95 | Good |
|  | 4 | 22.3 | 3.6 | 123000 | 60300 | 2.04 | Good |
|  | 5 | 25.1 | 3.4 | 200000 | 98000 | 2.04 | Good |
|  | 6 | 32.2 | 4.4 | 210000 | 102900 | 2.04 | Good |
| Example 3 | 1 | 2.0 | 3.9 | 84000 | 41600 | 2.02 | Good |
|  | 2 | 5.9 | 3.8 | 82000 | 40800 | 2.01 | Good |
|  | 3 | 9.9 | 3.6 | 76200 | 38700 | 1.97 | Good |
|  | 4 | 16.8 | 3.3 | 75000 | 37000 | 2.03 | Good |
|  | 5 | 22.1 | 3.1 | 73000 | 36000 | 2.04 | Good |
|  | 6 | 28.1 | 2.9 | 68000 | 33000 | 2.04 | Good |
| Comparative example 1 | 1 | 19.1 | 3.7 | Unmeasurable |  |  | Gel-like |
|  | 2 | 20.6 | 3.5 | 65000 | 20900 | 3.11 | Good |
|  | 3 | 22.4 | 3.4 | 65000 | 22100 | 2.94 | Good |
|  | 4 | 25.1 | 3.3 | 65000 | 22000 | 2.96 | Good |
| Comparative example 2 | 1 | 18.6 | 0 | 65000 | 32000 | 2.02 | Good |
|  | 2 | 20.3 | 0 | 65000 | 32000 | 2.02 | Good |
|  | 3 | 23.2 | 0 | 65000 | 32000 | 2.02 | Good |
|  | 4 | 30.1 | 0 | 65000 | 32000 | 2.02 | Good |
| Comparative example 3 | 1 | 14.4 | 3.9 | 56000 | 27800 | 2.01 | Poor 2) |
|  | 2 | 17.6 | 3.7 | 52100 | 27300 | 1.91 | Poor 2) |
|  | 3 | 20.1 | 3.5 | 56000 | 27600 | 2.03 | Poor 2) |
|  | 4 | 22.6 | 3.4 | 56000 | 27400 | 2.03 | Poor 2) |
|  | 5 | 26.5 | 3.3 | 54300 | 27400 | 1.98 | Poor 2) |
|  | 6 | 33.3 | 2.9 | 54000 | 26500 | 2.04 | Poor 2) |

1) Mw shows weight average molecular weight, Mn shows number average molecular weight and Mw/Mn shows dispersion.
2) After allowed to stand for a month at room temperature, discolored to reddish brown.

TABLE 2

To syndiotactic polypropylene prime material

|  |  | Immediately after production | | | After preservation for a month | | |
|---|---|---|---|---|---|---|---|
|  |  | Adherence | Gasoline resistance | Moisture resistance | Adherence | Gasoline resistance | Moisture resistance |
| Example 1 | 1 | 100/100 | Good | Good | 100/100 | Good | Good |
|  | 2 | 100/100 | Good | Good | 100/100 | Good | Good |
|  | 3 | 100/100 | Good | Good | 100/100 | Good | Good |
|  | 4 | 100/100 | Good | Good | 100/100 | Good | Good |
|  | 5 | 100/100 | Good | Good | 100/100 | Good | Good |
|  | 6 | 100/100 | Good | Good | 100/100 | Good | Good |
| Example 2 | 1 | 100/100 | Good | Good | 100/100 | Good | Good |
|  | 2 | 100/100 | Good | Good | 100/100 | Good | Good |
|  | 3 | 100/100 | Good | Good | 100/100 | Good | Good |
|  | 4 | 100/100 | Good | Good | 100/100 | Good | Good |
|  | 5 | 100/100 | Good | Good | 100/100 | Good | Good |
|  | 6 | 100/100 | Good | Good | 100/100 | Good | Good |
| Example 3 | 1 | 100/100 | Good | Good | 100/100 | Good | Good |
|  | 2 | 100/100 | Good | Good | 100/100 | Good | Good |
|  | 3 | 100/100 | Good | Good | 100/100 | Good | Good |
|  | 4 | 100/100 | Good | Good | 100/100 | Good | Good |
|  | 5 | 100/100 | Good | Good | 100/100 | Good | Good |
|  | 6 | 100/100 | Good | Good | 100/100 | Good | Good |
| Comparative example 1 | 1 | No implementation | | | No implementation | | |
|  | 2 | 30/100 1) | Poor | Poor | 20/100 1) | Poor | Poor |
|  | 3 | 20/100 1) | Poor | Poor | 20/100 1) | Poor | Poor |
|  | 4 | 0/100 1) | Poor | Poor | 0/100 1) | Poor | Poor |
| Comparative example 2 | 1 | 0/100 2) | Poor | Poor | 0/100 2) | Poor | Poor |
|  | 2 | 0/100 2) | Poor | Poor | 0/100 2) | Poor | Poor |
|  | 3 | 0/100 2) | Poor | Poor | 0/100 2) | Poor | Poor |
|  | 4 | 0/100 2) | Poor | Poor | 0/100 2) | Poor | Poor |

TABLE 2-continued

To syndiotactic polypropylene prime material

| | | Immediately after production | | | After preservation for a month | | |
|---|---|---|---|---|---|---|---|
| | | Adherence | Gasoline resistance | Moisture resistance | Adherence | Gasoline resistance | Moisture resistance |
| Comparative example 3 | 1 | 100/100 | Good | Good | 70/100 2) | Poor | Poor |
| | 2 | 100/100 | Good | Good | 70/100 2) | Poor | Poor |
| | 3 | 100/100 | Good | Good | 10/100 1) | Poor | Poor |
| | 4 | 100/100 | Good | Good | 10/100 1) | Poor | Poor |
| | 5 | 100/100 | Good | Good | 10/100 1) | Poor | Poor |
| | 6 | 100/100 | Good | Good | 10/100 1) | Poor | Poor |

1) Interlayer peeling between prime material and primer
2) Interlayer peeling between primer and top paint

TABLE 3

To Ultrahigh rigidity polypropylene prime material

| | | Immediately after production | | | After preservation for a month | | |
|---|---|---|---|---|---|---|---|
| | | Adherence | Gasoline resistance | Moisture resistance | Adherence | Gasoline resistance | Moisture resistance |
| Example 1 | 1 | 100/100 | Good | Good | 100/100 | Good | Good |
| | 2 | 100/100 | Good | Good | 100/100 | Good | Good |
| | 3 | 100/100 | Good | Good | 100/100 | Good | Good |
| | 4 | 100/100 | Good | Good | 100/100 | Good | Good |
| | 5 | 100/100 | Good | Good | 100/100 | Good | Good |
| | 6 | 100/100 | Good | Good | 100/100 | Good | Good |
| Example 2 | 1 | 100/100 | Good | Good | 100/100 | Good | Good |
| | 2 | 100/100 | Good | Good | 100/100 | Good | Good |
| | 3 | 100/100 | Good | Good | 100/100 | Good | Good |
| | 4 | 100/100 | Good | Good | 100/100 | Good | Good |
| | 5 | 100/100 | Good | Good | 100/100 | Good | Good |
| | 6 | 100/100 | Good | Good | 100/100 | Good | Good |
| Example 3 | 1 | 100/100 | Good | Good | 100/100 | Good | Good |
| | 2 | 100/100 | Good | Good | 100/100 | Good | Good |
| | 3 | 100/100 | Good | Good | 100/100 | Good | Good |
| | 4 | 100/100 | Good | Good | 100/100 | Good | Good |
| | 5 | 100/100 | Good | Good | 100/100 | Good | Good |
| | 6 | 100/100 | Good | Good | 100/100 | Good | Good |
| Comparative example 1 | 1 | No implementation | | | No implementation | | |
| | 2 | 100/100 | Good | Good | 100/100 | Good | Good |
| | 3 | 100/100 | Good | Good | 100/100 | Good | Good |
| | 4 | 70/100 1) | Poor | Poor | 55/100 1) | Poor | Poor |
| Comparative example 2 | 1 | 0/100 2) | Poor | Poor | 0/100 2) | Poor | Poor |
| | 2 | 0/100 2) | Poor | Poor | 0/100 2) | Poor | Poor |
| | 3 | 0/100 2) | Poor | Poor | 0/100 2) | Poor | Poor |
| | 4 | 0/100 2) | Poor | Poor | 0/100 2) | Poor | Poor |
| Comparative example 3 | 1 | 80/100 2) | Poor | Poor | 50/100 2) | Poor | Poor |
| | 2 | 70/100 2) | Poor | Poor | 10/100 1) | Poor | Poor |
| | 3 | 50/100 2) | Poor | Poor | 0/100 1) | Poor | Poor |
| | 4 | 10/100 1) | Poor | Poor | 0/100 1) | Poor | Poor |
| | 5 | 0/100 1) | Poor | Poor | 0/100 1) | Poor | Poor |
| | 6 | 0/100 1) | Poor | Poor | 0/100 1) | Poor | Poor |

1) Interlayer peeling between prime material and primer
2) Interlayer peeling between primer and top paint Adherence A hundred cross-cuts reaching the base were made on the painted surface at intervals of 2 mm and cellophane adhesive tape was adhered closely thereon. Then, it was peeled off in the direction of 180° to examine the extent of remaining painted-film.

Gasoline Resistance

A painted plate was soaked into regular gasoline:ethanol= 9:1 (v/v) for 120 minutes and the state of painted film was observed.

Moisture Resistance

A painted plate was soaked into warm water of 40° C. for 240 hours to examine the state of painted film and adherence.

Ultilizability in the Industry

It can be seen that, from the results in Table 1, the chlorinated products of SPP keep good state of solution, even if chlorine content may be low, and, from the results in Table 2, carboxyl group-containing chlorinated SPP is more excellent in the adherence to SPP prime material and the adherence to upper paint than carboxyl group-containing IPP. Moreover, it was recognized from the results in Table 3 that carboxyl group-containing chlorinated SPP was also excellent in the adherence to conventional ultrahigh rigidity PP prime material. Based on these results, it is seen that the inventive carboxyl group-containing chlorinated syndiotactic polyolefin is a useful resin as a binder resin.

What is claimed is:

1. A binder resin composition, comprising:
   a carboxyl group-containing chlorinated syndiotactic polyolefin resin with a chlorine content of 10 to 40 wt. %, a grafting level of α,β-unsaturated carboxylic acid and/or its acid anhydride of 1 to 10 wt. % and a weight average molecular weight of 30000 to 220000; and
   an organic solvent.

2. The binder resin composition of claim 1, wherein an epoxy resin is added additionally as a stabilizer.

3. The binder resin composition according to claim 1, wherein said syndiotactic polyolefin resin is a syndiotactic polypropylene, a propylene-α-olefin copolymer or a mixture thereof.

4. The binder resin composition according to claim 3, wherein an α-olefin component in said propylene-α-olefin copolymer has 2 or 4 to 6 carbon atoms.

5. The binder resin composition according to claim 3, wherein an α-olefin component is selected from the group consisting of ethylene, 1-butene, 1-pentene, 4-methyl-1-pentene, 3-methyl-1-pentene and 1-hexene.

6. The binder resin composition according to claim 3, wherein an amount of a propylene component in said propylene-α-olefin copolymer is not less than 50 mol %.

7. The binder resin composition according to claim 3, wherein said α,β-unsaturated carboxylic acid is selected from the group consisting of maleic acid, citraconic acid, itaconic acid, aconitic acid, acrylic acid, methacrylic acid, fumaric acid, mesaconic acid and a mixture thereof.

8. The binder resin composition according to claim 3, wherein said chlorine content is 10–30 wt. %.

9. The binder resin composition according to claim 3, wherein a concentration of said carboxyl group-containing chlorinated syndiotactic polyolefin resin in said organic solvent is 5 to 30 wt. %.

10. The binder resin composition according to claim 3, wherein said organic solvent is selected from the group consisting of an aromatic solvent, an ester solvent, a ketone solvent, an aliphatic solvent, an alicyclic solvent and a mixture thereof.

11. The binder resin composition according to claim 3, wherein said organic solvent is comprises an alcohol.

12. A method of producing a binder resin composition, comprising:
   graft copolymerizing α,β-unsaturated carboxylic acid and/or its acid anhydride onto a syndiotactic polyolefin produced using a metallocene compound as a polymerization catalyst in an amount of 1 to 10 wt. %;
   then chlorinating to a chlorine content of 10 to 40 wt. %, thereby obtaining a carboxyl group-containing chlorinated syndiotactic polyolefin resin; and
   dissolving the carboxyl group-containing chlorinated syndiotactic polyolefin resin having a weight average molecular weight of 30000 to 220000 in an organic solvent.

13. The method according to claim 12, wherein said metallocene compound comprises a Group IV transition metal in combination with methylaluminoxane.

14. The method according to claim 12, further comprising adding an epoxy compound.

15. A method of producing a binder resin composition, comprising:
   chlorinating a syndiotactic polyolefin produced using metallocene compound as a polymerization catalyst to a chlorine content of 10 to 40 wt. %;
   then graft copolymerizing α,β-unsaturated carboxylic acid and/or its acid anhydride in an amount of 1 to 10 wt. %, thereby obtaining a carboxyl group-containing chlorinated syndiotactic polyolefin resin; and
   dissolving the carboxyl group-containing chlorinated syndiotactic polyolefin resin having a weight average molecular weight of 30000 to 220000 in an organic solvent.

16. The method according to claim 15, wherein said metallocene compound comprises a Group IV transition metal in combination with methylaluminoxane.

17. The method according to claim 15, further comprising adding an epoxy compound.

18. A binder resin composition, comprising:
   a carboxyl group-containing chlorinated syndiotactic polyolefin resin with a chlorine content of 10 to 40 wt. %, a grafting level of α,β-unsaturated carboxylic acid and/or its acid anhydride of 1 to 10 wt. % and a weight average molecular weight of 30000 to 220000;
   an epoxy compound; and
   an organic solvent.

19. The binder resin composition according to claim 18, wherein said epoxy compound is selected from the group consisting of an epoxidated soybean oil, an epoxidated linseed oil, an epoxidated fatty acid ester, an epoxidated alicyclic compound, a monoepoxy compound and a mixture thereof.

* * * * *